(12) United States Patent
Afonso et al.

(10) Patent No.: US 11,325,708 B2
(45) Date of Patent: May 10, 2022

(54) UNIVERSAL PASSENGER SERVICE UNIT

(71) Applicant: Bombardier Inc., Dorval (CA)

(72) Inventors: Nelson J. Afonso, Alliston (CA); Carolin M. Zakee, Etobicoke (CA)

(73) Assignee: Bombardier Inc.

( * ) Notice: Subject to any disclaimer, the term of this patent is extended or adjusted under 35 U.S.C. 154(b) by 443 days.

(21) Appl. No.: 16/396,274

(22) Filed: Apr. 26, 2019

(65) Prior Publication Data

US 2019/0329889 A1 Oct. 31, 2019

Related U.S. Application Data (60) Provisional application No. 62/663,810, filed on Apr. 27, 2018.

(51) Int. Cl.
*B64D 11/00* (2006.01)
*B64D 13/00* (2006.01)
*B64D 45/00* (2006.01)

(52) U.S. Cl.
CPC .. *B64D 11/0015* (2013.01); *B64D 2011/0053* (2013.01); *B64D 2013/003* (2013.01); *B64D 2045/007* (2013.01)

(58) Field of Classification Search
CPC ........ B64D 11/0015; B64D 2011/0053; B64D 2013/003; B64D 2045/007; B64D 13/00; B64D 11/00
See application file for complete search history.

(56) References Cited

U.S. PATENT DOCUMENTS

| | | | | |
|---|---|---|---|---|
| 3,724,129 A | * | 4/1973 | Stromquist | F25D 23/02 49/70 |
| 5,921,670 A | * | 7/1999 | Schumacher | B64D 25/00 362/480 |
| 7,614,162 B2 | * | 11/2009 | Renzo | D06F 39/14 34/603 |
| 8,989,951 B1 | * | 3/2015 | Coop | B64F 5/60 701/31.4 |
| 9,487,296 B2 | * | 11/2016 | Freund | B60Q 3/76 |

(Continued)

FOREIGN PATENT DOCUMENTS

| CN | 1048478 A | * | 1/1991 | ....... B64D 11/00155 |
|---|---|---|---|---|
| CN | 102951292 A | * | 3/2013 | ......... B64D 11/0015 |

(Continued)

*Primary Examiner* — Behrang Badii
*Assistant Examiner* — Jalal C Coduroglu
(74) *Attorney, Agent, or Firm* — Fishman Stewart PLLC (57) ABSTRACT

A Passenger Service Unit (PSU) including an outer plate having an aperture therethrough. The outer plate has symmetry about at least one outer plate axis. The outer plate is configured to be couplable to a passenger compartment at a first position and a second position nonadjacent to the first position. The PSU also includes a first insert configured to be coupled to the outer plate and includes at least one component to be manipulated by a passenger in the passenger compartment. The first insert has symmetry about at least one insert axis and at least a portion of the first inner plate fits within the aperture. Further, the inner plate is rotatable with respect to the outer plate such that the inner plate can be coupled to the outer plate in a first orientation and a second orientation offset by substantially 180 degrees from the first orientation.

20 Claims, 9 Drawing Sheets

(56) References Cited

U.S. PATENT DOCUMENTS

| | | | | |
|---|---|---|---|---|
| 2003/0160706 A1* | 8/2003 | Endress | ........... | B64D 11/00155 340/945 |
| 2008/0112155 A1* | 5/2008 | Scown | ................... | F24F 13/078 362/96 |
| 2011/0090681 A1* | 4/2011 | Hobson | .................... | B60Q 3/47 362/217.05 |
| 2012/0292986 A1* | 11/2012 | Riedel | ...................... | B60Q 3/47 307/9.1 |
| 2013/0118493 A1* | 5/2013 | Umlauft | ................. | B64D 11/00 128/204.18 |
| 2013/0233971 A1* | 9/2013 | Burrows | .............. | B64D 11/003 244/118.5 |
| 2014/0215534 A1* | 7/2014 | Meckes | .................. | B64D 11/00 725/75 |
| 2015/0097082 A1* | 4/2015 | Paulino | .................... | A62B 7/14 244/118.5 |
| 2015/0140914 A1* | 5/2015 | Schneider | .............. | B64D 13/00 454/76 |
| 2015/0355988 A1* | 12/2015 | Lee | ....................... | G01R 31/008 714/27 |
| 2016/0214529 A1* | 7/2016 | Valentine, Jr | ............ | B60Q 3/47 |
| 2017/0088264 A1* | 3/2017 | Hessling-Von Heimendahl | ......... | B64D 11/00 |
| 2017/0129608 A1* | 5/2017 | Reams | ............... | B64D 11/0624 |

FOREIGN PATENT DOCUMENTS

| | | | | |
|---|---|---|---|---|
| DE | 102012008265 A1 * | 10/2013 | .............. | B64D 13/00 |
| DE | 102016011561 A1 * | 3/2018 | ............... | B60Q 3/44 |
| EP | 2759475 A2 * | 7/2014 | ......... | B64D 11/0015 |
| EP | 2557036 B1 * | 1/2016 | ....... | B64D 11/00155 |
| EP | 3147201 A1 * | 3/2017 | ........... | B64D 11/003 |
| EP | 2801523 B1 * | 10/2017 | ........ | B64D 11/0015 |
| WO | WO-2011133273 A1 * | 10/2011 | ......... | H04L 61/2038 |

* cited by examiner

UNIVERSAL PASSENGER SERVICE UNIT

CROSS REFERENCE TO RELATED APPLICATIONS

This application claims priority to U.S. Provisional Patent Application No. 62/663,810, filed Apr. 27, 2018, which is hereby incorporated by reference in its entirety.

TECHNICAL FIELD

The present disclosure is related generally to an improved passenger service unit. Although improvements are applicable to passenger service units associated with passenger aircrafts, for example, the improvements are also applicable to other vehicles that employ passenger compartments.

BACKGROUND

A passenger or personal service unit (PSU) is often employed in the passenger compartment of a vehicle. For example, a passenger aircraft may employ one or more PSUs that allows a passenger(s) to access or control one or more gaspers (i.e., a ventilation outlet or device), light control switch, flight attendant call button, and/or other devices accessible from a passenger's seat. Further, these PSUs may also include signage such as a lighted fasten seat belt sign or that WI-FI is selectively available.

The general interior architecture of a passenger compartment often affects the general shape of a PSU. That is, a PSU is generally manufactured to aesthetically blend with the architecture of the passenger compartment. This architecture may be dependent on the passenger location. For example, with regard to an automobile or a passenger aircraft, the shape of the architecture around a left-hand side passenger location often differs from the general shape around a right-hand side passenger location in that they are often mirror images of one another. Similarly, with regard to a passenger aircraft, the compartment shape around passenger locations fore in the plane often differ from the compartment shape around passenger locations aft in the plane.

Since there are generally local variations in passenger compartment shapes (e.g., fore, aft, left of aisle, and right of aisle), a wide variety of PSU shapes are often manufactured so that each may aesthetically blend with the local architecture around each passenger. That is, for example, often different PSU shapes are manufactured to blend with each of the left-side aft of the plane cabin, the right-side aft of the plane cabin, the left-side fore of the plane cabin, and the right-side fore of the plane cabin. In a similar manner, differing shaped PSUs are often manufactured to blend in with the local architecture around each passenger of other vehicles, such as automobiles.

The need to design and manufacture differently shaped PSUs for one vehicle can increase the cost and complexities associated with manufacturing such vehicle.

Thus, there is a need to create PSUs that can aesthetically blend with passenger compartment architecture in more than one location in the passenger compartment.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

DETAILED DESCRIPTION

Figure 1:
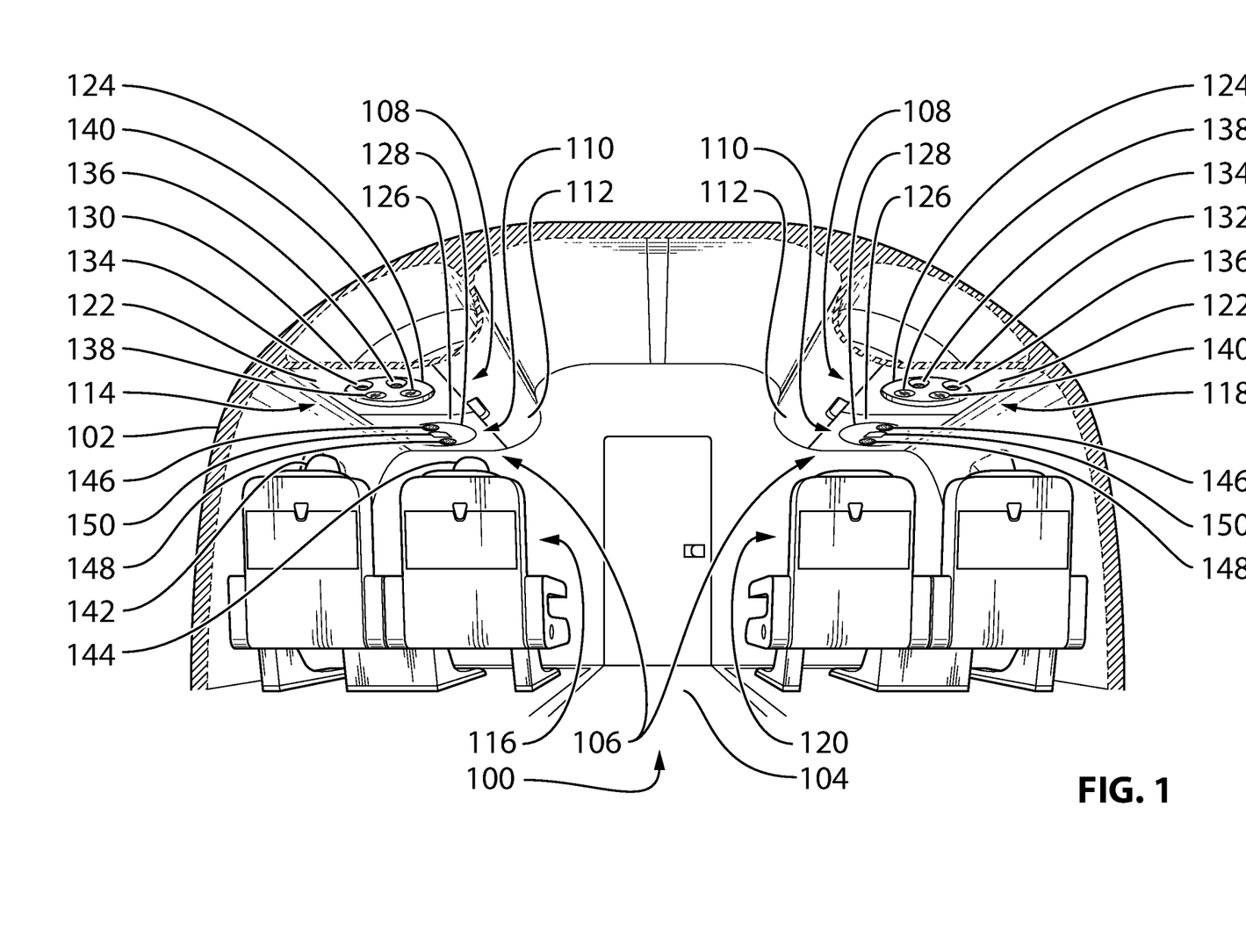
FIG. 1 illustrates exemplary passenger service units in a passenger compartment of a passenger aircraft.

FIG. 1 illustrates a perspective view of the interior of an exemplary passenger compartment 100 of a passenger aircraft 102. It is contemplated that the passenger compartment 100 could be a different architecture than that shown in FIG. 1. For example, the passenger compartment 100 could be a different size and/or layout and set forth different seating configurations than that shown in FIG. 1. Further, the passenger compartment 100 could be of a different vehicle than the passenger aircraft 102 shown in FIG. 1. For example, though not shown, other illustrative representations may include passenger compartments of other vehicles such as an automobile or a water vehicle.

Referring back to FIG. 1, the passenger compartment 100 includes an aisle 104, a storage bin underside 106, a first plurality of passenger service units (PSUs) 108, and a second plurality of PSUs 110. The first and second plurality of PSUs 108, 110, respectively, are located on the underside of the storage bins 106 of the passenger compartment 100 below cargo/luggage storage bins 112.

One of the first plurality of PSUs 108 is at a first position 114 on a first side 116 of the aisle 104 and the other of the first plurality of PSUs 108 is at a nonadjacent second position 118 on a second side 120 of the aisle 104. As illustrated, the first side 116 of the aisle 104 is substantially on an opposite side of the aisle 104 as the second side 120. The first plurality of PSUs 108 includes an outer plate or insert 122 and an inner plate or module 124, which is disc-shaped. While inner plate 124 is circular or disc-shaped, other examples may take a different shape (e.g., a parallelogram, ellipse, or other symmetrical shape).

Similarly, one PSU of the second plurality of PSUs 110 is on the first side 116 of the aisle 104 and the other PSU of the second plurality of PSUs 110 is on the second side 120 of the aisle 104. Each of the second plurality of PSUs 110 includes an outer plate 126 and an inner plate or module 128, which is disc-shaped.

The shape of the PSUs 108, 110 on the first side 116 align or aesthetically blend with a first contour 130 of the passenger compartment 100. Likewise, the shape of the PSUs 108, 110 on the second side 120 align or blend with a second contour 132 of the passenger compartment 100. According to the present example shown in FIG. 1, the first contour 130 is substantially a mirror image of the second contour 132.

Referring back to the first plurality of PSUs 108, each inner plate 124 includes a pair of first and second gaspers 134, 136 and a pair of first and second lights 138, 140. It will be appreciated by those skilled in the art that gaspers (e.g., gaspers 134, 136) are ventilation devices or components controllable by one or more passengers (e.g., a first passenger 142 and a second passenger 144).

Due to the orientation of the inner plates 124, adjacent passengers are each allowed easy access to the gaspers and lights. For example, with regard to the first PSU 108 on the first side 116 of the passenger compartment 100, a first passenger 142 is allowed uninterrupted access to the first gasper 134 and the first light 138, while a second passenger 144 is allowed uninterrupted access to the second gasper 136 and the second light 140.

With regard to the second plurality of PSUs 110, each inner plate 128 includes a speaker 146, a call button 148, and a passenger notification sign 150 (e.g., a lighted fasten seatbelt sign or a WI-FI availability notice). It is contemplated that the speaker 146 may be directionally biased. For example, with regard to the second PSU 110 on the first side 116 of the passenger compartment 100, the speaker 146 could be directionally biased towards both the first and second passenger 142, 144. Alternatively, the speaker 146 could be directionally biased towards passengers (not shown) in front of the first and second passengers 142, 144.

While not shown in FIG. 1, it is contemplated that one or more of the inner plates 124, 128 may include additional or different customer interaction features than those shown (i.e., the gaspers 134, 136, lights 138, 140, speaker 146, call button 148, and passenger notification sign 150). Further, it is also contemplated that the inner plates 124, 128 could be oriented differently than those shown in FIG. 1.

With continued reference to FIG. 1, the first PSU 108 on the first side 116 is interchangeable with the first PSU 108 across the aisle 104 on the second side 120. That is, the first PSU 108 at the first position 114 may instead be installed at the second position 118, and the first PSU 108 shown at the second position 118 may instead be installed at the first position 114.

In a similar manner, the second PSU 110 on the first side 116 is interchangeable with the second PSU 110 across aisle 104 on the second side 120. Further, it is contemplated that any one or more of the first plurality of PSUs 108 could be interchangeable with any one or more of the second plurality of PSUs 110 or upgradeable to include different or additional features to benefit the passenger experience. Further details regarding the interchangeability or upgradeability of the PSUs will be set forth in greater detail below with respect to FIGS. 2A-5B.

Figure 2A:
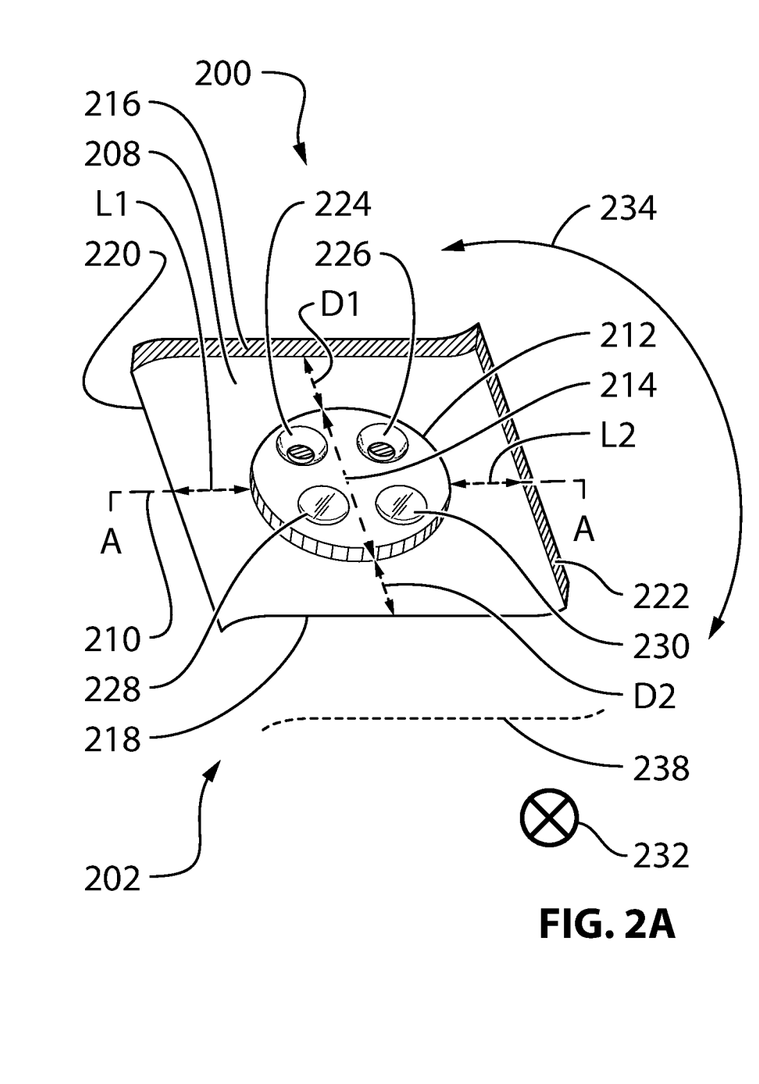
FIGS. 2A-2C illustrate different configurations of an exemplary passenger service unit (PSU)
Figure 2B:
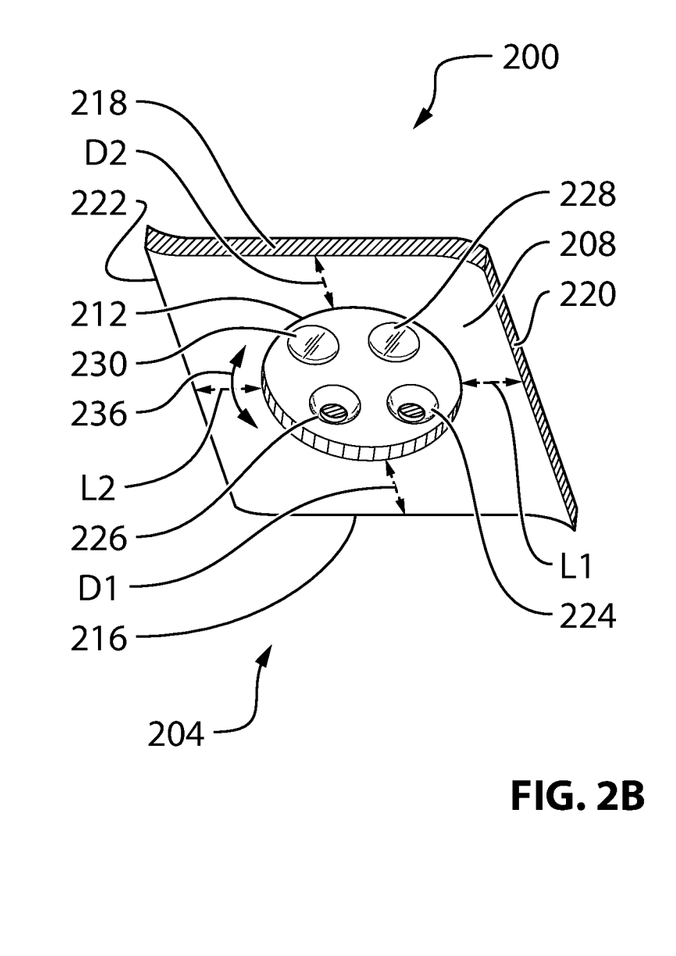
Figure 2C:
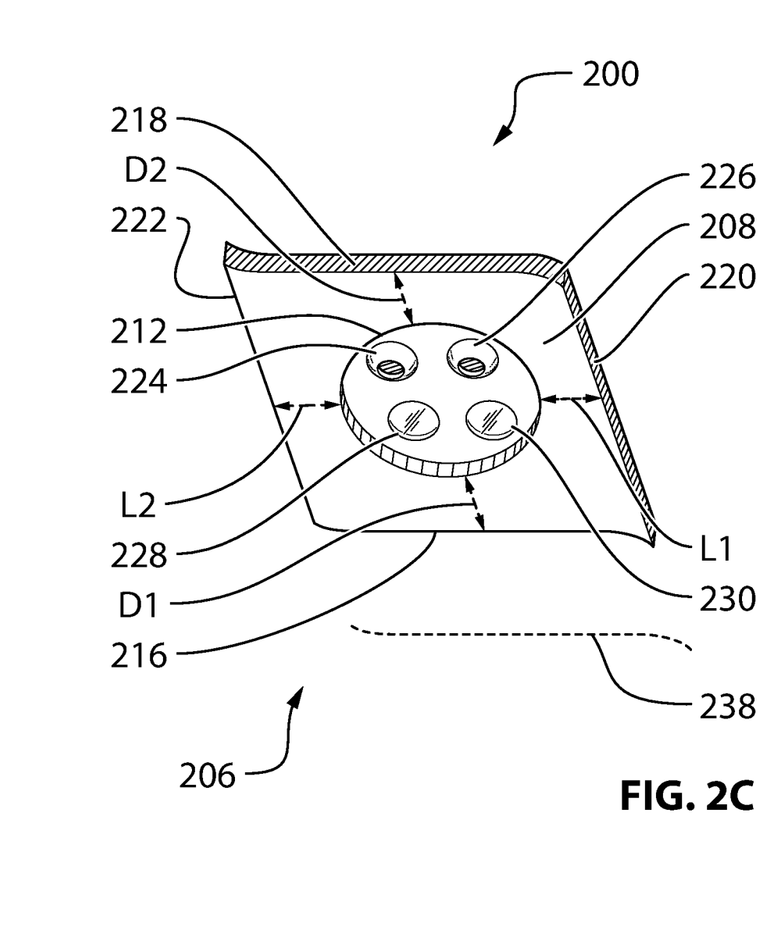

Referring now to FIGS. 2A-2C, a perspective view of an exemplary PSU 200 is shown. FIG. 2A depicts the PSU 200 in a first configuration 202, FIG. 2B depicts the PSU 200 in a second configuration 204, and FIG. 2C depicts the PSU 200 in a third configuration 206.

The PSU 200 includes an outer plate 208 having a bilateral axis of symmetry 210 and an inner plate 212 (i.e., an insert) also having a bilateral axis of symmetry 214. The outer and inner plates 208, 212 are bilaterally symmetric in that each has no more than one axis of symmetry (e.g., bilateral axis of symmetry 210 and bilateral axis of symmetry 214). While not shown, other examples may include outer and/or inner plates having more than one axis of symmetry. Further, other examples may also employ inner plates that are not circular, yet still having at least one axis of symmetry. For example, as discussed above, an inner plate(s) may have a parallelogram shape or other shape that has at least one axis of symmetry so that it can be employed on an opposite side of the passenger compartment.

With reference to FIG. 2A, due to the inner plate's 212 bilateral axis of symmetry 214 (i.e., insert axis), it is a distance D1 from a first side 216 and a distance D2 from a second side 218, where D1 is substantially equal to D2. Further, the inner plate 212 is a distance L1 from a third side 220 and a distance L2 from a fourth side 222. While L1 is greater than L2 in the example illustrated, other examples may have L1 equal to L2 or L1 less than L2.

The bilaterally symmetric inner plate 212 of FIGS. 2A-2C includes a first gasper 224, a second gasper 226, a first light 228, and a second light 230. While not shown, it is contemplated that different types, or other quantities, of passenger PSU components (i.e., customer interaction features 224-230) could instead be employed. Further, rather than being configured to benefit a row of two passengers (see e.g., passenger compartment 100 of FIG. 1), the inner plate could be configured with customer interaction features to benefit a row of one, three, four, or more passengers.

Still referring to FIGS. 2A-2C, the inner and outer plates 212, 208, respectively, are rotatable about an axis 232 perpendicular to the PSU 200. Each of the inner and outer plates 212, 208, respectively, can independently be rotated at least 180 degrees (or substantially 180 degrees) about the perpendicular axis 232. As will be described in detail below, due to such functionality and the bilateral axis of symmetries 210, 214 of both the bilaterally symmetric outer and inner plates 208, 212, the PSU 200 can be installed in multiple locations of a passenger compartment (e.g., on the first or second side 116, 120 of the passenger compartment 100 of passenger aircraft 102 of FIG. 1).

For example, with reference to FIGS. 2A-2C, the PSU 200 can be set in the first configuration 202 for installation on one side of a passenger compartment such as the first side 116 of the passenger airplane 102 shown in FIG. 1. In this first configuration 202, the first gasper 224 and the first light 228 would be easily accessible to one passenger (e.g., first passenger 142 of FIG. 1) and the second gasper 226 and the second light 230 would be easily accessible to an adjacent passenger (e.g., second passenger 144 of FIG. 1).

The orientation of the PSU 200, however, can be changed so that the PSU 200 may instead be placed in a different location of a passenger compartment (e.g., passenger compartment 100 of FIG. 1). For example, while in the first configuration 202, a first rotation 234 of the PSU 200 about the perpendicular axis 232 can place the PSU 200 in the second configuration 204 of FIG. 2B. Then, a rotation 236 of just the inner plate 212 (i.e., an inner plate rotation) can place the PSU 200 in the third configuration 206 of FIG. 2C. While the orientation of the outer plate 208 in the first configuration 202 (FIG. 2A) differs from the orientation of the outer plate 208 in the third configuration 206 (FIG. 2C), the orientation of the inner plate 212 does not substantially change between the first and third configurations 202, 206. That is, the PSU 200 in the first configuration 202 is substantially a mirror image of the PSU 200 in the third configuration 206. As such, while in the third configuration 206, the PSU 200 could be installed on an opposite side of the aircraft (e.g., the second side 120 of FIG. 1). Since the bilaterally symmetric outer plate 208 has its bilateral axis of symmetry 210 (i.e., outer plate axis) along a non-linear contour 238, the PSU 200 can be installed on opposite sides of a passenger compartment (e.g., the first side 116 or second side 120 of the passenger compartment 100 of FIG. 1) by simply rotating 234 the outer plate 208.

Take for example, the passenger compartment 100 of FIG. 1 having the first contour 130 on the first side 116 and the second contour 132 on the second side 120. According to the present example, the non-linear contour 238 (FIG. 2A) of the outer plate 208 matches the first contour 130 of FIG. 1. By rotating the outer plate 208 (FIG. 2A) approximately 180 degrees about the perpendicular axis 232, its non-linear contour 238 will effectively match the second contour 132 of FIG. 1. Accordingly, the outer plate 208 of FIG. 2A may be installed on either side of a passenger compartment. Of course other contours (not shown), either linear or non-linear, that match contours (or lack thereof) of other passenger compartments are contemplated.

Further, since the inner plate 212 is rotatable, the PSU assembly 200 can be placed in the first and third configurations 202, 206, respectively. For example, the inner plate 212 can be: (i) placed in a first orientation with respect to the outer plate 208 as shown in FIGS. 2A-2B and (ii) placed in a second orientation with respect to the outer plate 208 that is offset by 180 degrees from the first orientation as shown in FIG. 3C. Therefore, the PSU 200 can be placed on the left or right side of a passenger compartment (e.g., the first side 116 or the second side 120 of passenger compartment 100 of FIG. 1) with its inner plate 212 in its intended orientation with respect to a passenger.

The manner in which the PSU assembly 200 is changed from its first configuration 202 to the third configuration 206 can differ than the manner described above. For example, though not shown, the inner plate 212 can first be rotated substantially 180 degrees before the entire PSU assembly 200 is rotated substantially 180 degrees to place the PSU assembly in the third configuration 206. As another example, the inner plate 212 may be rotated to its intended orientation prior to inserting the inner plate 212 into the outer plate 208.

Due to the ability of the PSU assembly 200 to be positioned on mirror-imaged sides of a passenger compartment, unique left-side and right-side PSUs do not need to be manufactured. In other words, one type of PSU assembly (e.g., PSU 200) can be used for an entire aircraft. The configuration of each PSU can be manipulated so that it may be installed in its intended location (e.g., left or right side of a passenger compartment).

It is envisioned, however, that additional differently shaped PSUs (not shown) could be employed while still not having to manufacture PSU assemblies specific to left and right sides. For example, though not shown, one shaped PSU assembly with a rotatable inner plate could be used on the left and right sides of an aft portion of an aircraft, while a differently shaped PSU assembly with a rotatable insert could be used on the left and right sides of a fore section of an aircraft.

Again, though not shown, it is noted that other outer plates having different contours are envisioned so that differently shaped PSUs may be installed in different passenger compartments.

Figure 2D:
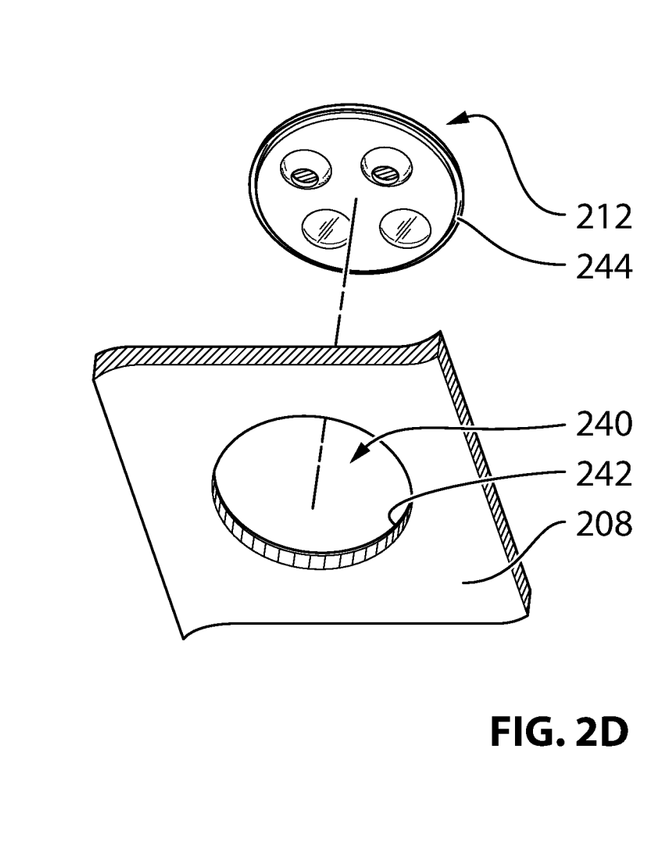
FIG. 2D illustrates an exploded view of the exemplary PSU depicted in FIG. 2A.

Referring now to FIG. 2D, an exploded view of the PSU 200 of FIGS. 2A-2C is shown. The outer plate 208 includes a void or aperture 240 therethrough along with a ridge 242 around the perimeter of the aperture 240, while the inner plate 212 includes a channel 244 around its perimeter. Though not shown, other examples may include additional apertures and respective inner plates. Further, apertures of different shapes may be employed to accommodate inner plate(s) of different shapes (e.g., parallelogram, ellipse, or other symmetric shape).

According to an example illustrated in FIG. 2D, the channel 244 of the inner plate 212 may mate with the ridge 242 of the outer plate 208 so that the inner plate 212 and outer plate 208 may be coupled together. It is envisioned that, once coupled together, the inner plate 212 would be rotatable within the outer plate 208. As such, the PSU assembly 200 can be carried to its intended location as one piece and be manipulated into its intended configuration before installment. Alternatively, the inner plate 212 may be rotated to its intended orientation prior to inserting the inner plate 212 through the void 240 of the outer plate 208. Accordingly, if a non-circular inner plate is employed (along with an appropriately shaped aperture), the non-circular inner plate can be coupled to the outer plate in its intended orientation prior to installing the PSU in its intended location.

Referring back to FIG. 2D, it is noted that other mating or coupling methods that differ from the ridge 242/channel 244 pair are envisioned.

Figure 2E:
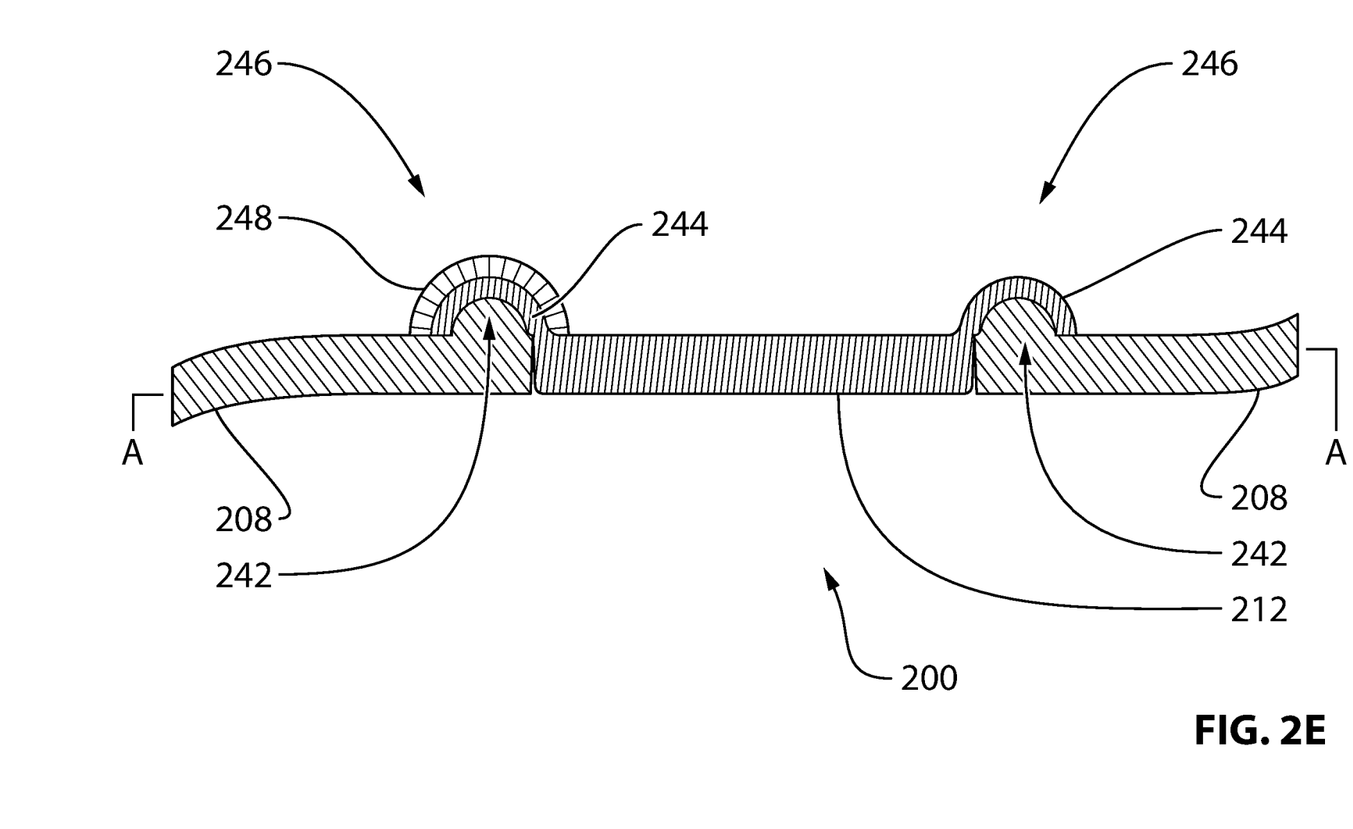
FIG. 2E illustrates a cross-sectional view of the exemplary PSU of FIG. 2A along A-A.

With reference now to FIG. 2E, a cross-sectional view of the PSU 200 along A-A of FIG. 2A is shown. A portion of a snap-fit connection 246 is depicted, which allows the inner plate 212 to be snap-fitted to the outer plate 208. As illustrated, the snap-fit connection 246 includes the channel 244 of the inner plate 212 snap-fitted or mated with the ridge 242 of the outer plate 208. It is contemplated that when the inner plate 212 is snap-fit to the outer plate 208, the inner plate 212 may still be rotatable. However, when the inner plate 212 is in its intended position or orientation, it is contemplated that a stopping component 248 may be affixed, coupled, or engaged to the PSU 200 so that the inner plate 212 can no longer rotate within the outer plate 208. That is, stopping component or element 248 is couplable to, or engageable with, at least the circular insert (i.e., inner plate 212) to inhibit rotation of the circular insert 212. As such, when the PSU assembly 200 is be mounted in a passenger compartment (e.g., the first side 116 of the passenger compartment 100 of FIG. 1), a passenger (e.g., the first or second passenger 142, 144 of FIG. 1) cannot rotate the inner plate 212.

The stopping component 248 may be a u-shaped connector crimped around a portion of the channel 244 to cause the channel 244 to squeeze the ridge 242 so that rotation of the inner plate 212 is inhibited. While the u-shaped stopping component 248 is shown, it is noted that other manners of inhibiting rotation are contemplated.

It is again also noted that other manners of coupling the inner plate 212 to the outer plate 208, different than the snap-fit method described above, may be employed.

Figure 3A:
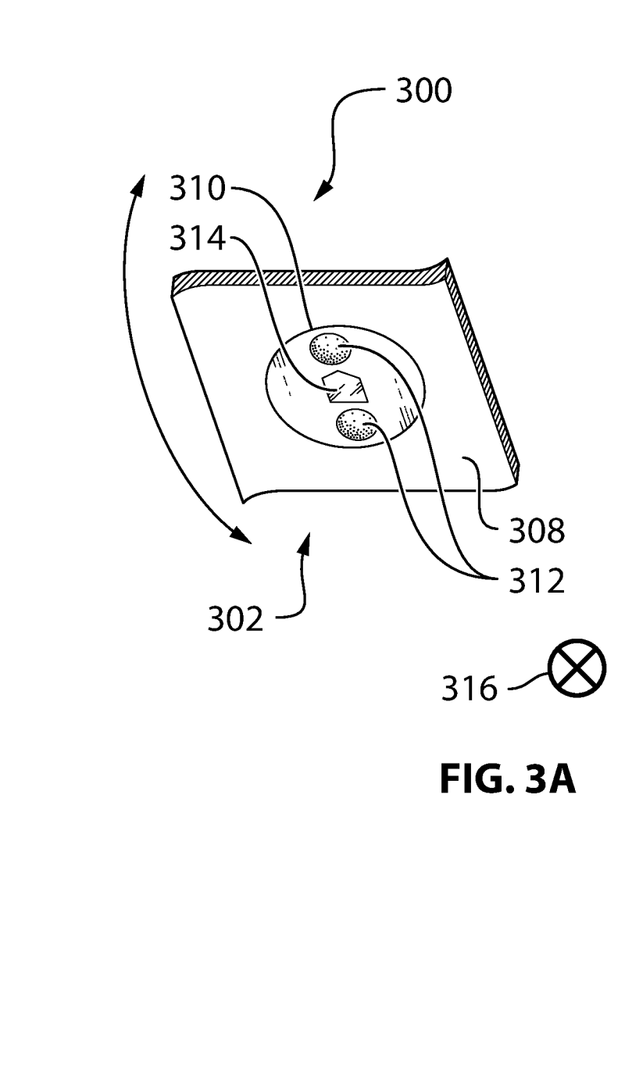
FIGS. 3A-3C illustrate different configurations of another exemplary PSU.
Figure 3B:
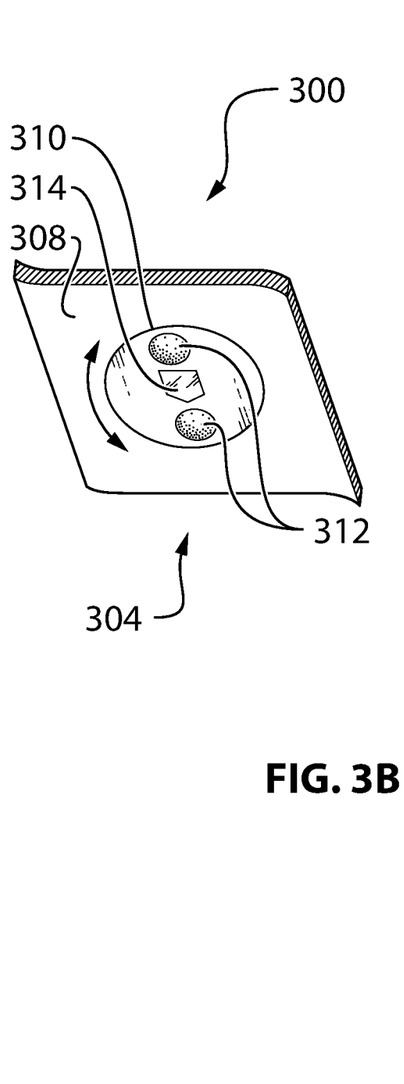
Figure 3C:
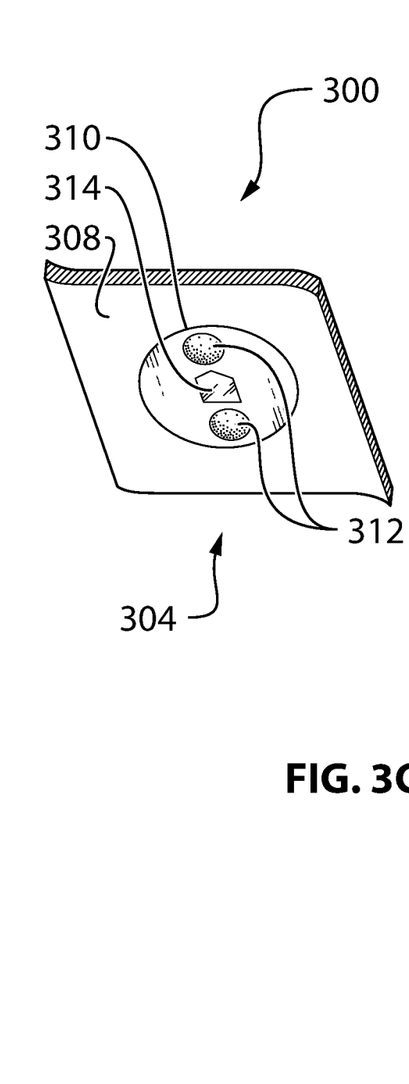

With reference now to FIGS. 3A-3C, a perspective view of another PSU assembly 300 is shown. FIG. 3A depicts the PSU assembly 300 in a first configuration 302, FIG. 3B depicts the PSU assembly 300 in a second configuration 304, and FIG. 3C depicts the PSU assembly 300 in a third configuration 306.

The PSU assembly 300 includes a bilaterally symmetric outer plate 308 and a rotatable inner plate or disc 310. The rotatable inner plate includes a pair of speakers 312 and a lighted passenger notification sign 314 (e.g., a sign showing symbols for fastening seatbelts, remaining seated, and/or etc.). It is contemplated, however, that the PSU assembly 300 may employ a different arrangement of passenger components than those shown (i.e., passenger components 312-314). For example, rather than the pair of speakers 312, one speaker and a call button may be employed along with the passenger notification sign 314.

In its first configuration 302, the second PSU assembly 300 is ready to be installed on one side of an aircraft (e.g., on the first side 116 of the passenger aircraft 102 of FIG. 1). Further, in its third configuration 306 of FIG. 3C, the same PSU assembly 300 could be installed on an opposite side of the aircraft (e.g., on the second side 120 of the passenger aircraft 102 of FIG. 1).

To transition from the first configuration 302 of FIG. 3A to the third configuration 306 of FIG. 3C, the second PSU assembly 300 is rotated about an axis 316 perpendicular to the second PSU assembly 300. This rotation of substantially 180 degrees puts the second PSU assembly 300 in the second configuration 304. While in the second configuration 304, the outer plate 308 is positioned for placement on the opposite side of an aircraft or other vehicle, but the inner plate 310 is not properly positioned. As such, while the second PSU assembly 300 is in the second configuration 304, the inner plate 310 can be rotated substantially 180 degrees to place the second PSU assembly 300 in the third configuration 306. Accordingly, the second PSU assembly 300 in its third configuration 306 is ready for install on the opposite side of an aircraft or other vehicle.

The manner in which the second PSU assembly 300 is changed from its first configuration 302 to the third configuration 306 may differ from the manner described above. For example, though not shown, the inner plate 310 may first be rotated substantially 180 degrees before the entire second PSU assembly 300 is rotated substantially 180 degrees to place the second PSU assembly 300 in the first or third configuration 302, 306, respectively.

Further, it is contemplated that an inner plate of a PSU assembly may be swapped out with a different inner plate. For example, the inner plate 310 of the PSU assembly 300 could be removed and replaced with the inner plate 212 depicted in FIGS. 2A-2C. As another example, the void or aperture 240 of the outer plate 208 of FIG. 2A may be configured to accept a second inner plate (such as rotatable inner plate 310 of FIG. 3A) when the first inner plate 212 is not inserted into the aperture 240 of the outer plate 208.

Referring back to FIGS. 3A-3C, since the inner plate 310 may be removed and replaced with a different inner plate (not shown), the PSU assembly 300 can be updated with a different inner plate having updated customer interaction features or components.

As discussed above with respect to FIGS. 1-2C, one side of a passenger compartment is often substantially a mirror image of an opposite side of the passenger compartment. Since the outer plate (e.g., outer plate 208) is symmetrical along an axis of symmetry (e.g., bilateral axis 210), the outer plate can be placed on either side of the passenger compartment simply by rotating the outer plate. Further, by rotating the inner plate (see e.g., the second configuration of FIG. 1 compared to the third configuration), the inner plate can be placed in the preferred orientation with respect to a passenger. As such, the entire PSU assembly (e.g., PSU assembly 300) can be placed on either side of a passenger cabin.

While the examples discussed above with respect to FIGS. 1-3C set forth a PSU having an outer plate that supports one inner plate or insert, other examples may include PSUs having an outer plate that supports more than one inner plate. For example, FIGS. 4A-5B set forth exemplary outer plates able to support more than one inner plate.

Figure 4A:
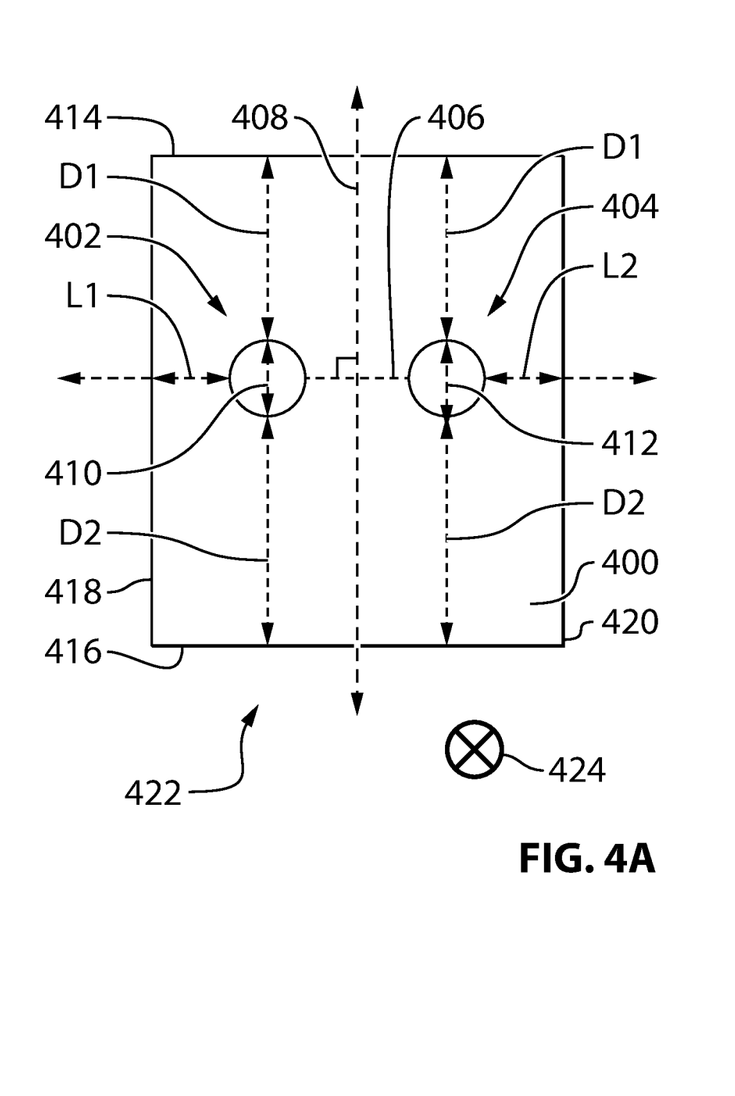
FIGS. 4A-4B illustrate different orientations of an exemplary outer plate of a PSU.
Figure 4B:
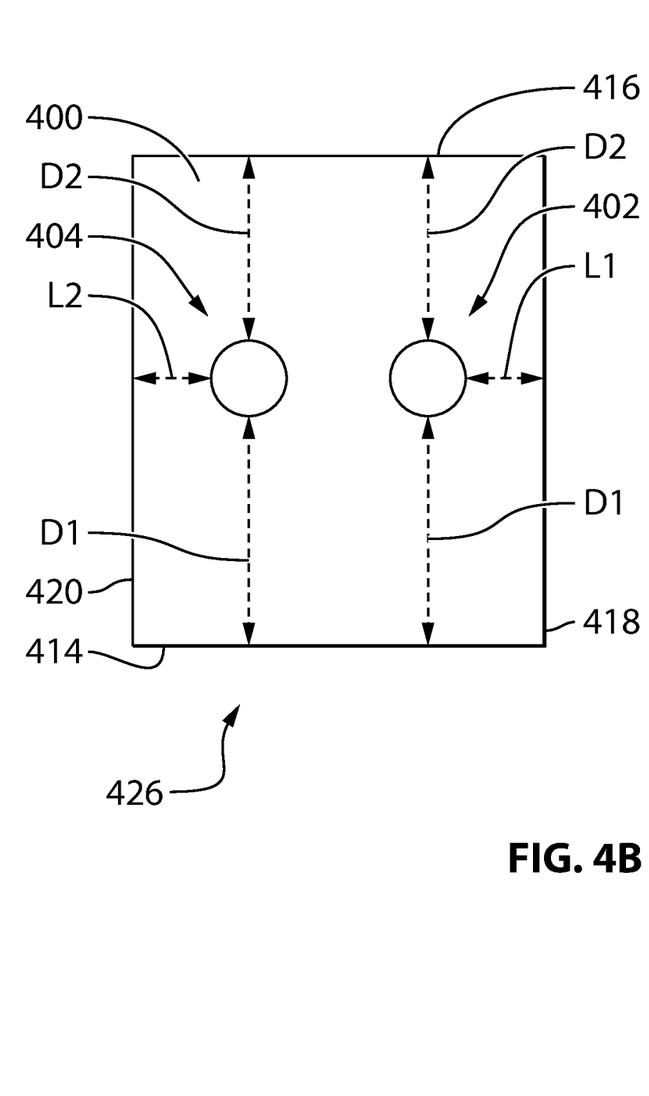

FIGS. 4A-4B illustrate an outer plate 400 having a first and a second aperture 402, 404, respectively. The outer plate 400 is symmetric about a first axis of symmetry 406 and a perpendicular second axis of symmetry 408. Other examples, not shown, may only be symmetric along the first axis of symmetry such that the first axis of symmetry is a bilateral axis of symmetry.

With continued reference to FIGS. 4A-4B, the first aperture 402 has a first diameter 410 and the second aperture 404 has a second diameter 412. While, FIGS. 4A-4B illustrate the first diameter 410 being equal to the second diameter 412, other examples may employ a symmetric outer plate (bilateral or otherwise) having apertures of unequal diameters. Further, though not shown, other exemplary outer plates may include additional apertures while still being symmetric about at least one axis of symmetry.

Referring back to FIGS. 4A-4B, each of the apertures 402, 404 are at a distance D1 from a first side 414 of the outer plate and a distance D2 from a second side 416 of the outer plate 400, where D1 is at least substantially equal to D2. Further, the first aperture 402 is a distance L1 from a left side 418 and the second aperture 404 is a distance L2 from a right side 420. In the example illustrated in FIGS. 4A-4B, L1 equals L2. In other examples, however, L1 may not be equal to L2, though the outer plate would be symmetric along no more than one axis (i.e., bilaterally symmetric).

Regardless of the relationship between L1 and L2, the outer plate 400 may be positioned in a first orientation 422 (FIG. 4A) to be installed on one side of a passenger cabin, or rotated about a perpendicular axis 424 to a second orientation 426 (FIG. 4B) to be installed on an opposite side of the passenger cabin. While not shown, an inner plate within the apertures would be rotatable such that each could be placed in its desired orientation (see e.g., the orientation of the inner plate 212 in the second configuration 204 of FIG. 2B and compare with the orientation of the same inner plate 212 in the third configuration 206 of FIG. 2C).

Figure 5A:
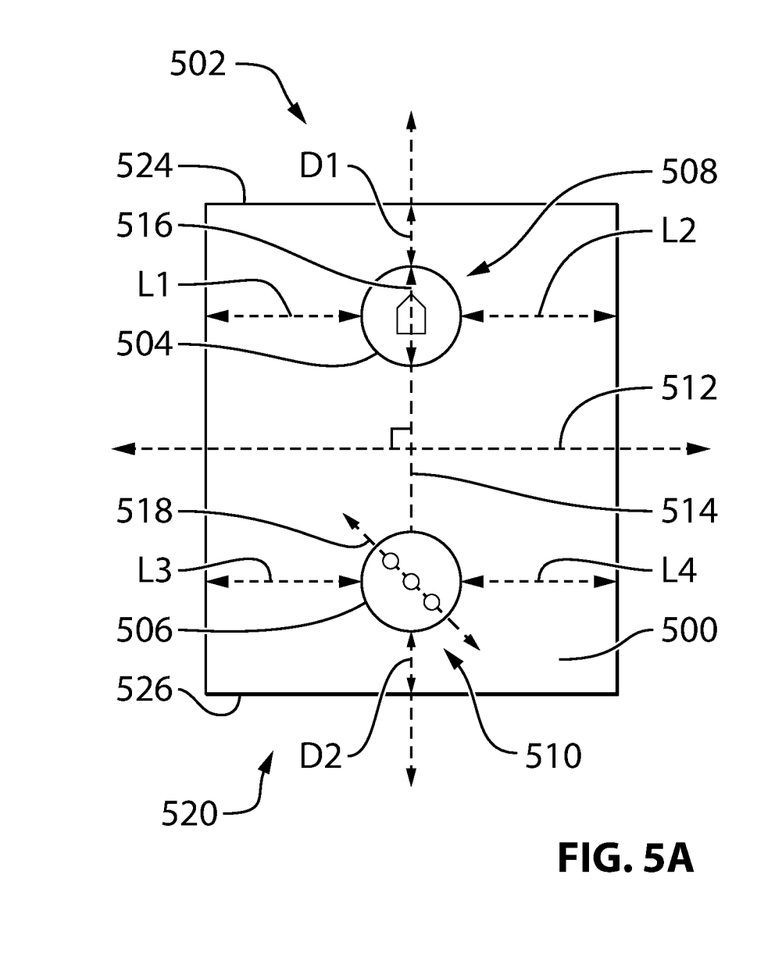
FIGS. 5A-5B illustrate different configurations of another exemplary PSU.
Figure 5B:
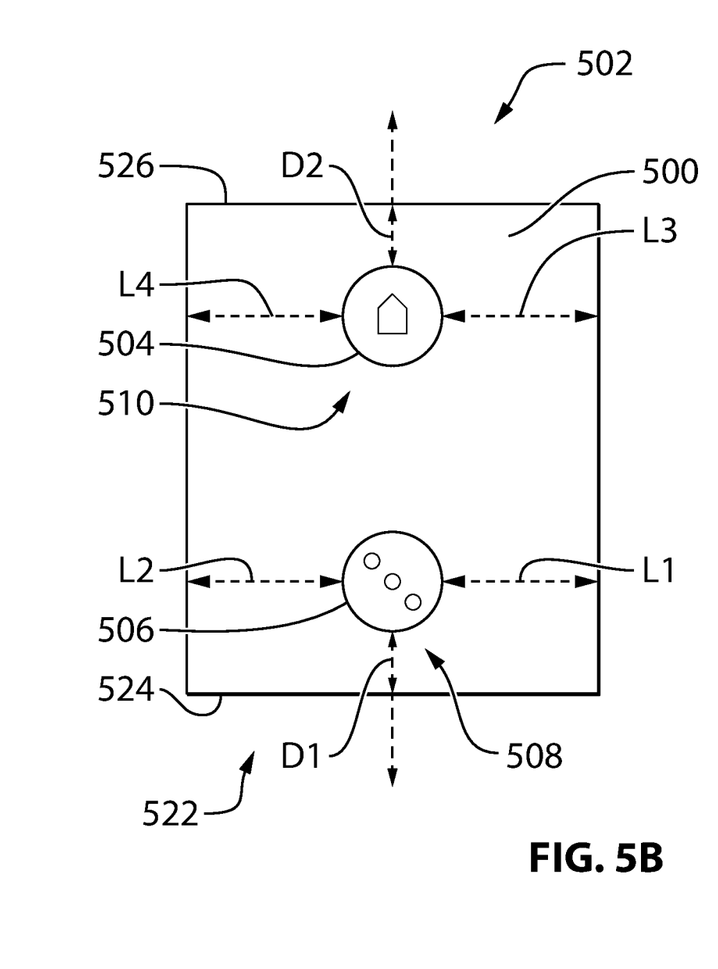

FIGS. 5A-5B illustrate another example of an outer plate 500 of a PSU 502. In addition to the outer plate 500, the PSU 502 also includes a first and a second insert 504, 506, respectively positioned within a first aperture 508 and a second aperture 510.

The outer plate 500 is symmetric about both a first axis of symmetry 512 and a perpendicular second axis of symmetry 514. The first insert 504 is symmetric about one axis of symmetry 516 and the second insert 516 is also symmetric about another axis of symmetry 518.

It is noted that other exemplary outer plates not shown may only be symmetric about the first axis of symmetry such that the first axis of symmetry is a bilateral axis of symmetry. Further, in other examples, the insert(s) may be symmetric about more than one axis of symmetry.

Referring back to FIGS. 5A-5B, the PSU 502 is in a first orientation 520 in FIG. 5A and in a second orientation 522 in FIG. 5B after it has gone through a rotation of substantially 180 degrees. Since the outer plate 500 is symmetric along at least the first axis of symmetry 512, the outer plate 500 in the first orientation 520 is substantially a mirror image of the outer plate 500 in the second orientation 522. Accordingly, the outer plate 500 may be positioned on opposite sides of a passenger compartment, where one side of the compartment is substantially a mirror image of the other side. (e.g., the first and second side 116, 120, respectively, of the passenger compartment 100 of FIG. 1).

While the outer plate 500 of FIG. 5A in the first orientation 520 is a mirror image of the outer plate 500 of FIG. 5B in the second orientation 522, the entire PSU assembly 502 in the first orientation 520 is also a mirror image of the entire PSU assembly 502 in the second orientation 522. To accomplish this, the position of the inserts 504, 506 were swapped.

That is, the first insert 504 was removed from the first aperture 508 of FIG. 5A, rotated, and placed in the second aperture 510 of FIG. 5B. Similarly, the second insert 506 was removed from the second aperture 510 of FIG. 5A, rotated, and placed in the first aperture 508 of FIG. 5B. Accordingly, the PSU assembly 502 in the first orientation 520 of FIG. 5A is substantially a mirror image of the PSU assembly 502 in the second orientation 522 of FIG. 5B.

Though not shown, if both inserts were the same, they would only need to be rotated, and not swapped, to create the mirror images of the first and second orientations 520, 522.

It is noted that the first insert 504 is a distance D1 from a first side 524 and the second insert 506 is a distance D2 from a second side 526 opposite the first side 524. Because of the axis of symmetry 512, D1 equals D2. Also, because of the other axis of symmetry 514, the distances L1, L2, L3, and L4 are all equal. However, in an alternate example, not shown, where the outer plate only has a bilateral axis of symmetry (e.g., axis of symmetry 512), L1 and L2 may be equal, and L3 and L4 may be equal, while L1 does not equal L3.

Figure 6A:
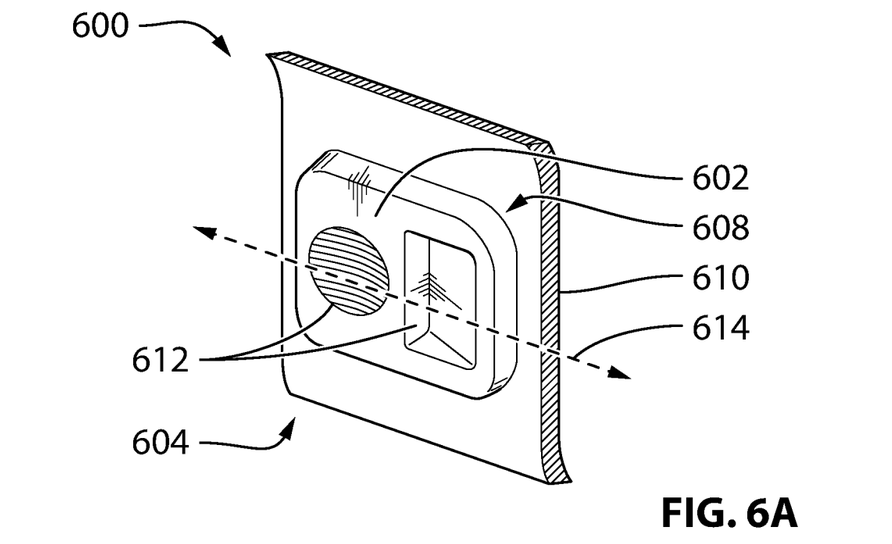
FIGS. 6A-6B illustrate perspective views of another exemplary PSU.
Figure 6B:
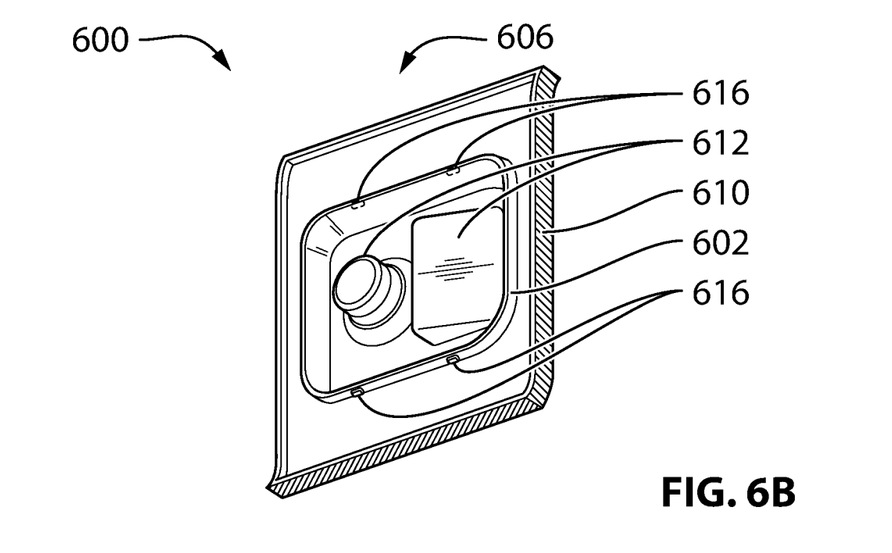

As discussed above, the inner plate(s) of a PSU may be a symmetric shape different than a circular shape. FIGS. 6A-6B illustrate an example of a PSU assembly 600 having a non-circular inner plate 602. FIG. 6A is a perspective view of a passenger viewable side 604 of the PSU assembly 600 and FIG. 6B is a perspective view of the PSU assembly 600 from an opposite side 606 of the passenger side view 604.

The PSU assembly 600 includes the non-circular inner plate 602 within a non-circular aperture 608 of an outer plate 610. The non-circular inner plate 602 has a parallelogram-like shape and includes passenger interaction components 612. Due to the shape and configuration of the passenger interaction components 612, the inner plate 602 has a bilateral axis of symmetry 614.

As shown in FIG. 6B, a set of four tabs 616 (i.e., a coupling and stopping component) couples the inner plate 602 to the outer plate 610. As with the PSU assemblies described above (e.g., PSU assemblies 108, 110 of FIG. 1, 200 of FIGS. 2A-2D, 300 of FIGS. 3A-3B), the outer plate 610 of FIGS. 6A-6B has symmetry and the inner plate 602 may be rotated by 180 degrees with respect to the outer plate 610 so that the PSU assembly 600 may be positioned on opposite sides of a passenger compartment. However, since the inner plate 602 is not circular, the inner plate would be rotated to its intended orientation prior to coupling it to the outer plate 610. Alternatively, if the inner plate 602 is coupled to the outer plate 610 and it is desired to change the inner plate orientation, the inner plate 602 may be uncoupled via the set of four tabs 616 and repositioned before recoupling via the set of four tabs 616. Accordingly, as with the other PSU assemblies described above, the PSU assembly 600 of FIGS. 6A-6B may be installed on mirror-imaged sides of a passenger compartment. That is, both the outer plate 610 and inner plate 602 may be independently rotated to the desired orientations to configure the PSU assembly 600 to be installed on either side of a passenger compartment as described above with respect to FIGS. 2A-2C and FIGS. 3A-3B.

Figure 7:
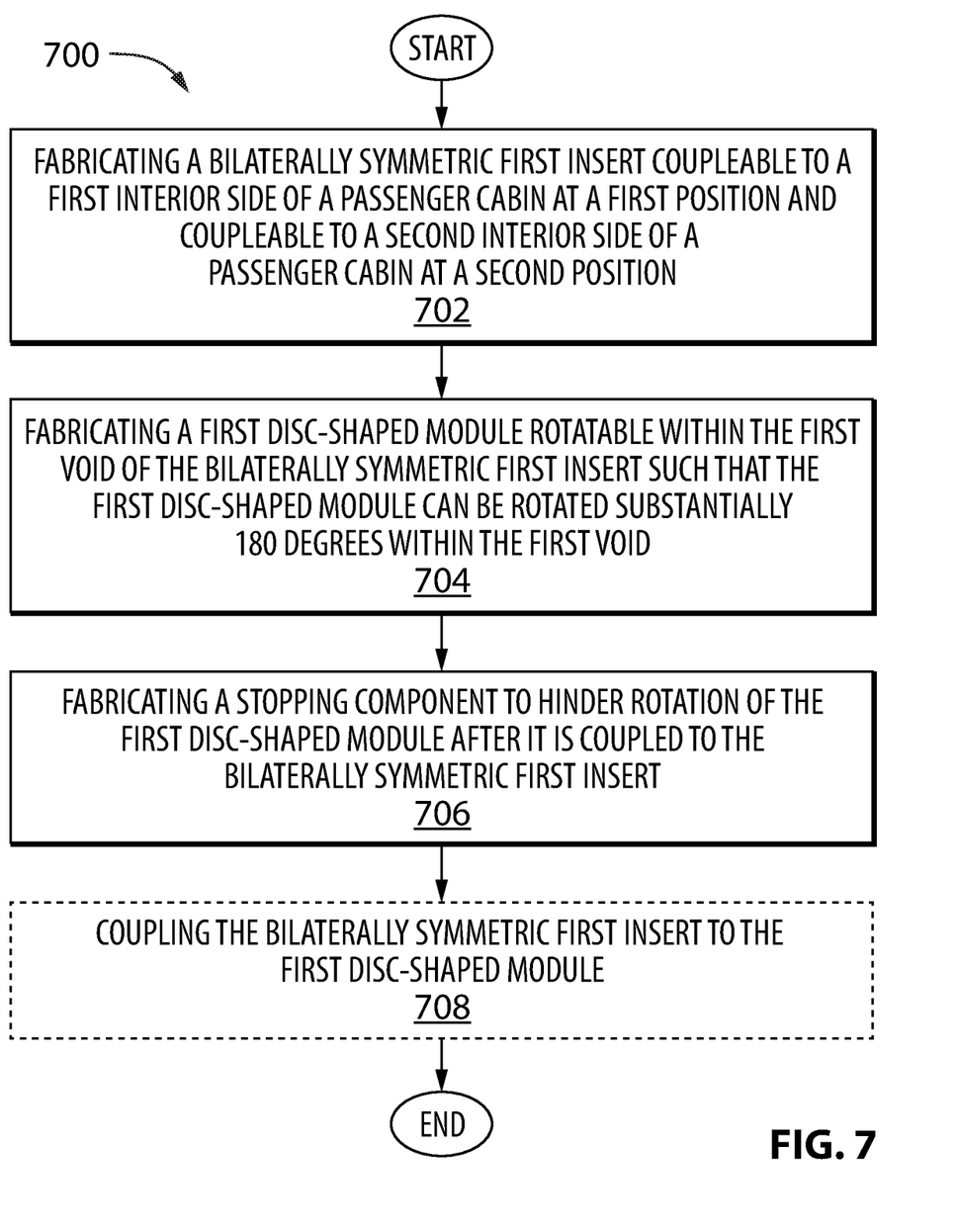
FIG. 7 is a flowchart setting forth an exemplary technique for manufacturing an exemplary PSU.

With reference now to FIG. 7, a flowchart setting forth an exemplary technique or method 700 of manufacturing a PSU is shown.

Process control begins at BLOCK 702 where producing a first insert (i.e., a bilaterally symmetric outer plate) couplable to a first interior side of a passenger cabin at a first position and couplable to a second interior side of a passenger cabin at a second position when substantially rotated 180 degrees, is set forth. According to the technique 700, the first interior side of the passenger cabin is across a passenger aisle opposite the second interior side, and the first insert has a first void therethrough.

Further, it is contemplated that the first insert has a bilateral axis of symmetry (e.g., bilateral axis of symmetry 210 of FIG. 2A). The bilaterally symmetric first insert may have either a linear or a non-linear contour along its bilateral axis of symmetry.

Process control then proceeds to BLOCK 704 where making a first disc-shaped module (i.e., an inner plate) rotatable within the first void of the first insert such that the first disc-shaped module can be rotated at least substantially 180 degrees within the first void, is set forth. The first disc-shaped module has at least one passenger gasper and at least one passenger light.

Technique 700 continues, as process control proceeds to BLOCK 706, where fashioning a stopping component to inhibit rotation of the first disc-shaped module after it is coupled to the outer insert is set forth. The stopping component may, for example, be one or more molded components designed for the PSU. Alternatively, the fashioned stopping component may be a component purchased from an outside source. The stopping component may be installed or engaged in the PSU assembly once the disc-shaped module is oriented in its preferred manner. As such, once engaged or installed, a passenger cannot rotate the disc-shaped module to a different position. Of course, in other example, the stopping component may not be installed or engaged during installation of the PSU. As such, a passenger would be free to rotate the disc-shaped module as desired.

After BLOCK 706, process control proceeds to an END. It is, however, contemplated that process control may instead proceed to BLOCK 708 (shown in phantom), where coupling the bilaterally symmetric first insert to the first disc-shaped module occurs. In such an instance, it is contemplated that the coupling occurs such that (i) the first disc-shaped module remains rotatable within the void of the bilaterally symmetric first insert and (ii) the PSU assembly is installable on one side of a passenger compartment and on an opposite side of the passenger compartment, where the one side is substantially a mirror image of the opposite side.

Technique 700 illustrates a sequence that includes first producing an outer plate (BLOCK 702), then making the inner plate (BLOCK 604), which is followed by fashioning of the stopping components (BLOCK 706). It is contemplated, however, that the order of BLOCKS 702-706 may be rearranged in any order desired.

While not shown, technique 700 could also include making a second disc-shaped module rotatable within the first void of the bilaterally symmetric first insert such that the second disc-shaped module can be rotated at least substantially 180 degrees within the first void, where the second disc-shaped module has at least one of a speaker and a fasten seatbelt sign.

Further, the technique 700 may also include coupling the bilaterally symmetric first insert to the second disc-shaped module such that (i) the second disc-shaped module remains rotatable within the void of the bilaterally symmetric first insert and (ii) the PSU assembly is installable on one side of a passenger compartment and on an opposite side of the passenger compartment, where the one side is substantially a mirror image of the opposite side.

With regard to FIGS. 1-7 and the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A Passenger Service Unit (PSU) comprising:
   an outer plate having an aperture therethrough, the outer plate having symmetry about at least one outer plate axis, wherein the outer plate is configured to be couplable to a passenger compartment at a first position and a second position nonadjacent to the first position; and
   a first insert configured to be coupled to the outer plate and comprising at least one component to be manipulated by a passenger in the passenger compartment, the first insert having symmetry about at least one insert axis, wherein at least a portion of the first insert fits within the aperture, and wherein the first insert is rotatable with respect to the outer plate such that the first insert can be coupled to the outer plate in a first orientation and a second orientation offset by substantially 180 degrees from the first orientation.

2. The PSU of claim 1 wherein a portion of the first insert viewable through the aperture is circular, and wherein the insert axis is a bilateral axis of symmetry such that the first insert has no more than one axis of symmetry.

3. The PSU of claim 2 wherein the first insert in configured to be affixed to the outer plate after it is rotated such that the first insert no longer rotates within the outer plate.

4. The PSU of claim 2 wherein the outer plate axis is along a nonlinear contour of the outer plate, and wherein the outer plate is bilaterally symmetric such that the outer plate is only symmetric about the outer plate axis.

5. The PSU of claim 1 wherein the first insert has a parallelogram shape.

6. The PSU of claim 1 wherein the PSU is configured to be assembled in a first configuration and assembled in another configuration that is substantially a mirror image of the first configuration.

7. The PSU of claim 4 wherein the aperture of the outer plate is configured to accept a second insert when the first insert is not inserted into the aperture of the outer plate, wherein the second insert is rotatable within the aperture of the outer plate.

8. The PSU of claim 4 wherein the PSU is configured to be installed on an underside of a storage bin of the passenger compartment of an aircraft, and wherein the first position is on a first side of a passenger aisle and the second position is on a second side of the passenger aisle that is opposite the first side.

9. The PSU of claim 8 wherein the outer plate further comprises a second aperture therethrough configured to accept a second insert that is rotatable within the outer plate.

10. A passenger service unit (PSU) assembly of an airplane, the PSU assembly comprising:
    a contoured outer plate having an aperture therethrough, wherein the contoured outer plate is configured to (i) match a first ceiling contour on a first side of a plane passenger cabin and (ii) match a second ceiling contour on a second side of the plane passenger cabin opposite the first side when the contoured outer plate is rotated substantially 180 degrees; and
    an insert configured to couple to the contoured outer plate and cover the aperture, wherein the insert is rotatable such that a portion of the insert covering the aperture can rotate with respect to the contoured outer plate, the insert comprising at least one device for use by at least one passenger.

11. The PSU assembly of claim 10 wherein the contoured outer plate has an outer plate axis of symmetry and the insert has an insert axis of symmetry, and wherein a shape of the insert viewable through the aperture is one of a parallelogram, ellipse, and circle.

12. The PSU assembly of claim 11 wherein the contoured outer plate is bilaterally symmetric such that the contoured outer plate has no more axes of symmetry than the outer plate axis of symmetry.

13. The PSU assembly of claim 12 wherein the insert is bilaterally symmetric such that the insert has no more axes of symmetry than the insert axis of symmetry.

14. The PSU assembly of claim 11 further comprising a stopping component couplable to at least the insert to inhibit rotation of the insert.

15. The PSU assembly of claim 14 further comprising an additional insert configured to couple to the contoured outer plate and cover the aperture, wherein the additional insert is rotatable such that a portion of the additional insert covering the aperture can rotate with respect to the contoured outer plate, the additional circular insert comprising a different device for use by at least one passenger different than the at least one device.

16. A method of manufacturing a passenger service unit (PSU) assembly comprising:
    producing a bilaterally symmetric first insert couplable to a first interior side of a passenger cabin at a first position and couplable to a second interior side of a passenger cabin at a second position when substantially rotated 180 degrees, the first interior side of the passenger cabin is across a passenger aisle opposite the second interior side, wherein the bilaterally symmetric first insert has a first void therethrough;

making a first disc-shaped module rotatable within the first void of the bilaterally symmetric first insert such that the first disc-shaped module can be rotated substantially 180 degrees within the first void, the first disc-shaped module having at least one passenger gasper and at least one passenger light; and fashioning a stopping component to hinder rotation of the first disc-shaped module after it is coupled to the bilaterally symmetric first insert.

17. The method of manufacturing the PSU assembly of claim 16 further comprising coupling the bilaterally symmetric first insert to the first disc-shaped module such that (i) the first disc-shaped module remains rotatable within the void of the bilaterally symmetric first insert and (ii) the PSU assembly is installable on one side of a passenger compartment and on an opposite side of the passenger compartment, wherein the one side is substantially a mirror image of the opposite side.

18. The method of manufacturing the PSU assembly of claim 16 further comprising making a second disc-shaped module rotatable within the first void of the bilaterally symmetric first insert such that the second disc-shaped module can be rotated substantially 180 degrees within the first void, the second disc-shaped module having at least one of a speaker and a fasten seatbelt sign.

19. The method of manufacturing the PSU assembly of claim 18 further comprising coupling the bilaterally symmetric first insert to the second disc-shaped module such that (i) the second disc-shaped module remains rotatable within the void of the bilaterally symmetric first insert and (ii) the PSU assembly is installable on one side of a passenger compartment and on an opposite side of the passenger compartment, wherein the one side is substantially a mirror image of the opposite side.

20. The method of manufacturing the PSU assembly of claim 16 wherein the producing the bilaterally symmetric first insert comprises producing the bilaterally symmetric first insert such that the bilaterally symmetric first insert has a nonlinear contour along a bilateral axis of symmetry.

* * * * *